United States Patent
Wu et al.

(10) Patent No.: US 9,188,757 B2
(45) Date of Patent: Nov. 17, 2015

(54) CABLE ASSEMBLY WITH ELECTRICAL-OPTICAL HYBRID CABLE

(71) Applicant: HON HAI PRECISION INDUSTRY CO., LTD., New Taipei (TW)

(72) Inventors: Jerry Wu, Irvine, CA (US); Chien-Chiung Wang, New Taipei (TW); Qing-Man Zhu, Kunshan (CN); Ru-Yang Guo, Kunshan (CN); Peng Zhai, Kunshan (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/147,608

(22) Filed: Jan. 6, 2014

(65) Prior Publication Data
US 2014/0193122 A1    Jul. 10, 2014

(30) Foreign Application Priority Data
Jan. 4, 2013    (CN) .......................... 2013 1 0001480

(51) Int. Cl.
| | |
|---|---|
| *G02B 6/36* | (2006.01) |
| *G02B 6/44* | (2006.01) |
| *G02B 6/38* | (2006.01) |
| *G02B 6/42* | (2006.01) |

(52) U.S. Cl.
CPC ............ *G02B 6/4416* (2013.01); *G02B 6/3817* (2013.01); *G02B 6/428* (2013.01); *G02B 6/4283* (2013.01); *G02B 6/4284* (2013.01)

(58) Field of Classification Search
CPC .. G02B 6/3821; G02B 6/3869; G02B 6/3885; G02B 6/4292; G02B 6/4246; G02B 6/4416; H01B 11/22

USPC ............................ 385/77, 88–89, 101
See application file for complete search history.

(56) References Cited

U.S. PATENT DOCUMENTS

| | | |
|---|---|---|
| 7,371,014 B2 | 5/2008 | Willis et al. |
| 2009/0141270 A1* | 6/2009 | Whitehead ................... 356/247 |
| 2010/0046891 A1* | 2/2010 | Sabo ............................ 385/74 |
| 2010/0124395 A1* | 5/2010 | Lin et al. .................... 385/76 |
| 2010/0290745 A1* | 11/2010 | Liao et al. .................... 385/90 |
| 2011/0262082 A1* | 10/2011 | Sakurai et al. ............... 385/89 |
| 2012/0020629 A1* | 1/2012 | Shiratori et al. ............. 385/93 |
| 2012/0063726 A1* | 3/2012 | Wu ............................. 385/88 |
| 2013/0129284 A1* | 5/2013 | Torikai et al. ............... 385/75 |
| 2013/0259427 A1 | 10/2013 | Intel |

FOREIGN PATENT DOCUMENTS

| | | |
|---|---|---|
| CN | 2629277 | 7/2004 |
| CN | 102213802 | 10/2011 |
| CN | 102263335 | 11/2011 |

\* cited by examiner

*Primary Examiner* — Ellen Kim
(74) *Attorney, Agent, or Firm* — Wei Te Chung; Ming Chieh Chang

(57) ABSTRACT

A cable assembly comprises: an insulative housing; a plurality of contacts received into the insulative housing; a printed circuit board located behind the insulative housing and electrically connected with the plurality of contacts; a metallic shell enclosing the insulative housing and the printed circuit board; an insulative shell enclosing a rear portion of the metallic shell; and a cable having a plurality of optical fibers coupled to a top surface of the printed circuit board and a plurality of copper wires electrically connected to a bottom surface of the printed circuit board.

15 Claims, 10 Drawing Sheets

CABLE ASSEMBLY WITH ELECTRICAL-OPTICAL HYBRID CABLE

FIELD OF THE INVENTION

The present invention generally relates to a cable assembly, more specifically to a cable assembly having electrical-optical hybrid cable used for optical and electrical signal transmission.

DESCRIPTION OF PRIOR ART

Nowadays, high speed cable assembly is usually widely used to connect the PC or server to an external device for signal transmission therebetween and comprises a cable having a plurality of copper wires and two plug connectors respectively connected with two ends of the cable. It is well known that the copper wires of the cable have advantages of lower cost and stability signal transmitting. However, in order to satisfy the stability of the signal transmission of the cable assembly, the length of the copper wire is limited within a certain distance. So, in the case of the far distance between two external devices, the copper wires connected to the two external devices can not meet stability of the signal transmission of the cable assembly. On the other hand, copper wire as a transmission medium, also can not meet higher and higher data transfer rate between two external devices. And optical fiber as another transmission medium, has advantages of long transmission distance, very high data transmission rate, very wide frequency band, low bit error rate and low delay. Therefore, optical fiber as the transmission medium has been adopted by more and more cable assembly. For example, US Publication No. 20130259427 published to Chun on Oct. 3, 2013 discloses an active optical cable assembly comprising a cable having a plurality of optical fibers with two ends respectively coupled to two printed circuit boards formed in two connector plugs of the cable assembly. However, the cable assembly with optical fiber cable also has its own shortcomings, such as can not provide power supply function in the signal transmission.

A cable assembly with an improved cable overcoming shortages of existing technology is needed.

SUMMARY OF THE INVENTION

Accordingly, an object of the present invention is to provide a cable assembly with an electrical-optical hybrid cable used for high speed optical and electrical signal transmission and providing power supply function.

In order to achieve the above-mentioned object, a cable assembly comprises: an insulative housing; a plurality of contacts received into the insulative housing; a printed circuit board located behind the insulative housing and electrically connected with the plurality of contacts; a metallic shell enclosing the insulative housing and the printed circuit board; an insulative shell enclosing a rear portion of the metallic shell; and a cable having a plurality of optical fibers coupled to a top surface of the printed circuit board and a plurality of copper wires electrically connected to a bottom surface of the printed circuit board.

Other objects, features and advantages of the invention will be apparent from the following detailed description taken in connection with the accompanying drawings.

DETAILED DESCRIPTION OF PREFERRED EMBODIMENTS

Figure 1:
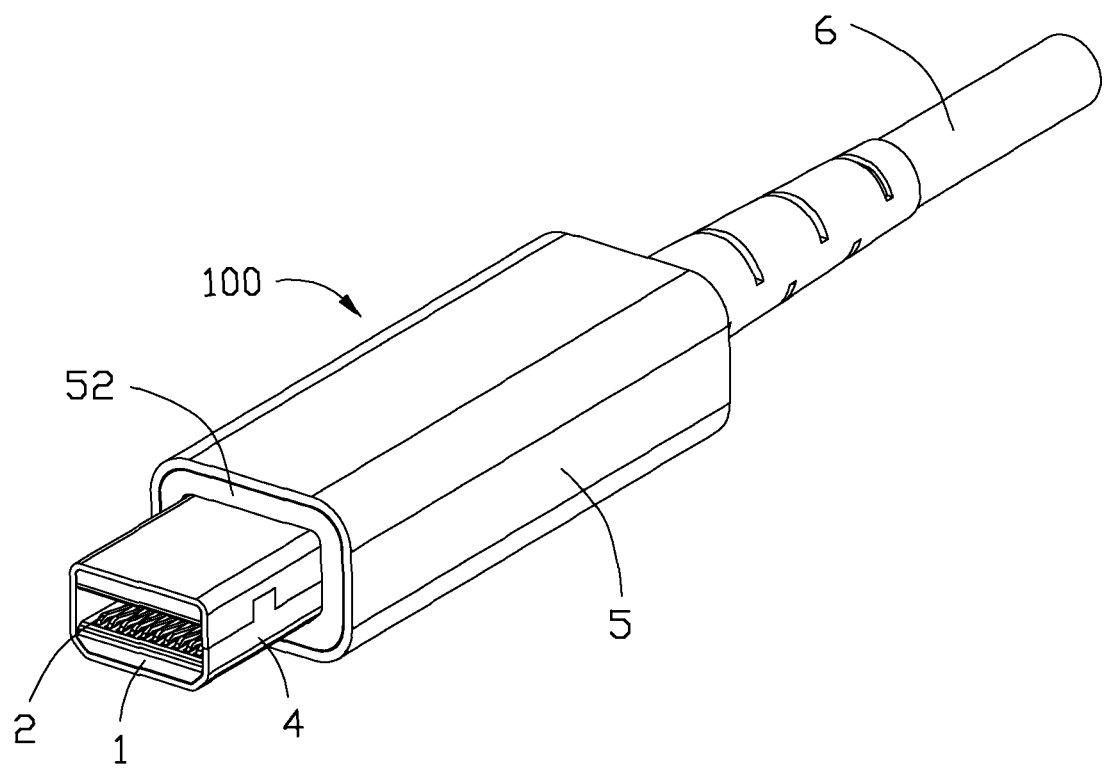
FIG. 1 is a perspective, assembled view of a cable assembly in accordance with the present invention.

Reference will now be made to the drawing Figures to describe the present invention in detail.

Figure 2:
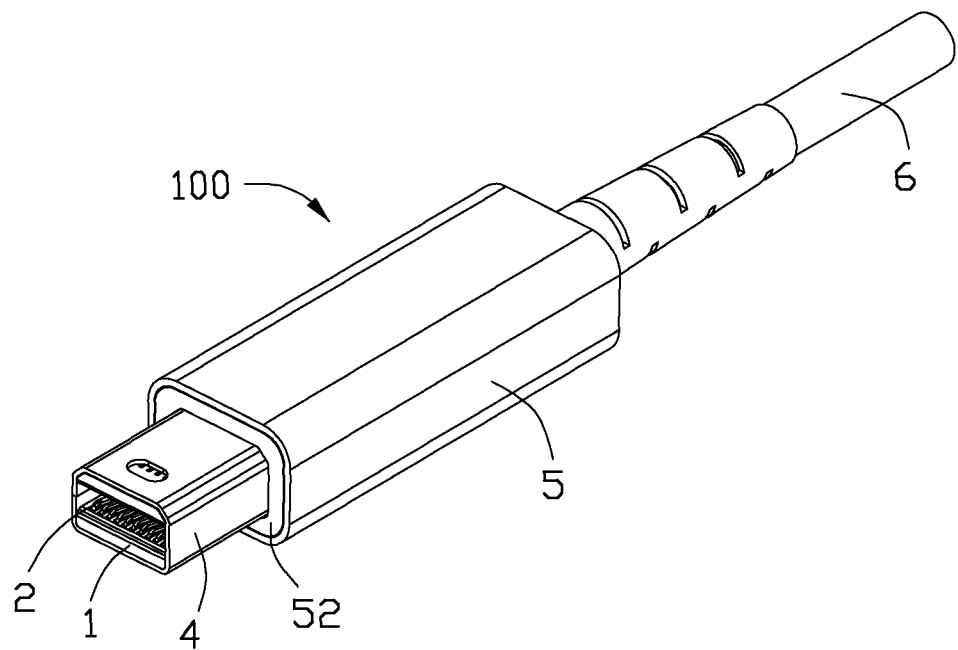
FIG. 2 is similar to FIG. 1, but viewed from another aspect.

FIGS. 1 and 2 illustrate perspective view of a cable assembly 100 made in accordance with the present invention. Referring to FIGS. 3 to 9, the cable assembly 100 comprises an insulative housing 1, a plurality of contacts 2 received into the insulative housing 1, a printed circuit board 3 electrically connected to the plurality of contacts 2, a metallic shell 4 enclosing the insulative housing 1 and printed circuit board 3, an insulative shell 5 enclosing the metallic shell 4 and a cable 6 coupled to the printed circuit board 3.

Figure 3:
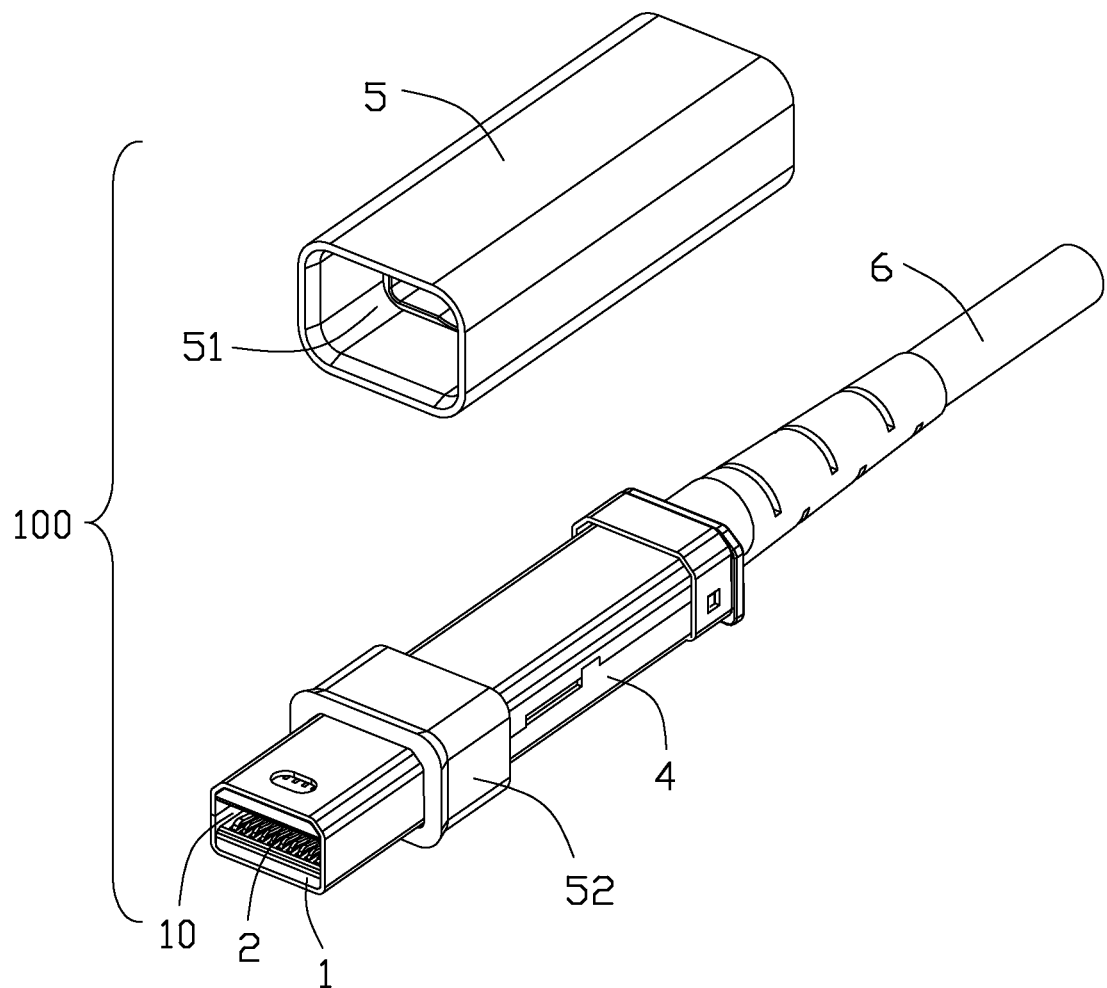
FIG. 3 is a partial assembled view of FIG. 2 showing a cover detached from the metallic shell.
Figure 4:
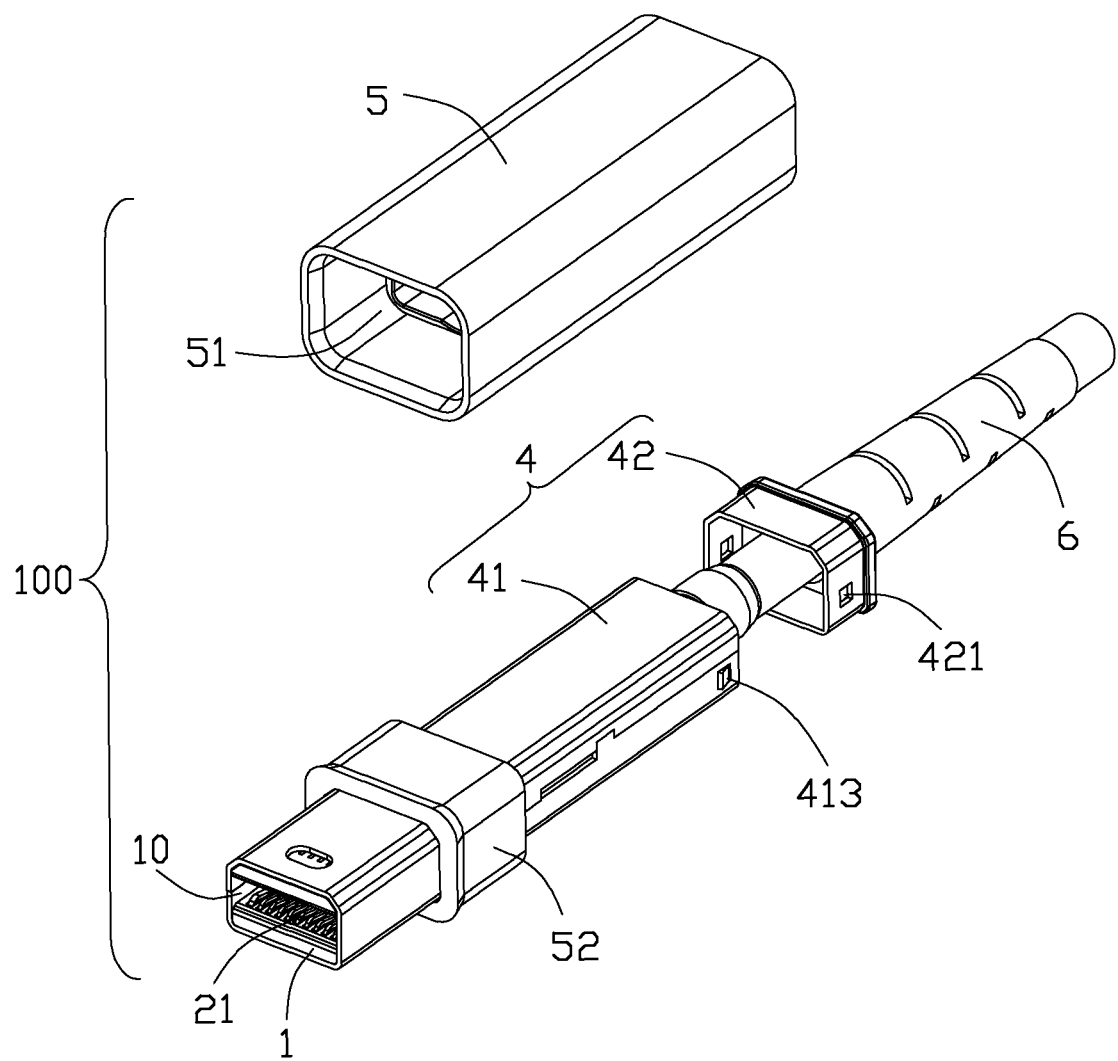
FIG. 4 is another partial assembled view of FIG. 2 showing the cover detached from the metallic shell, and a rear shell detached from a front shell.
Figure 5:
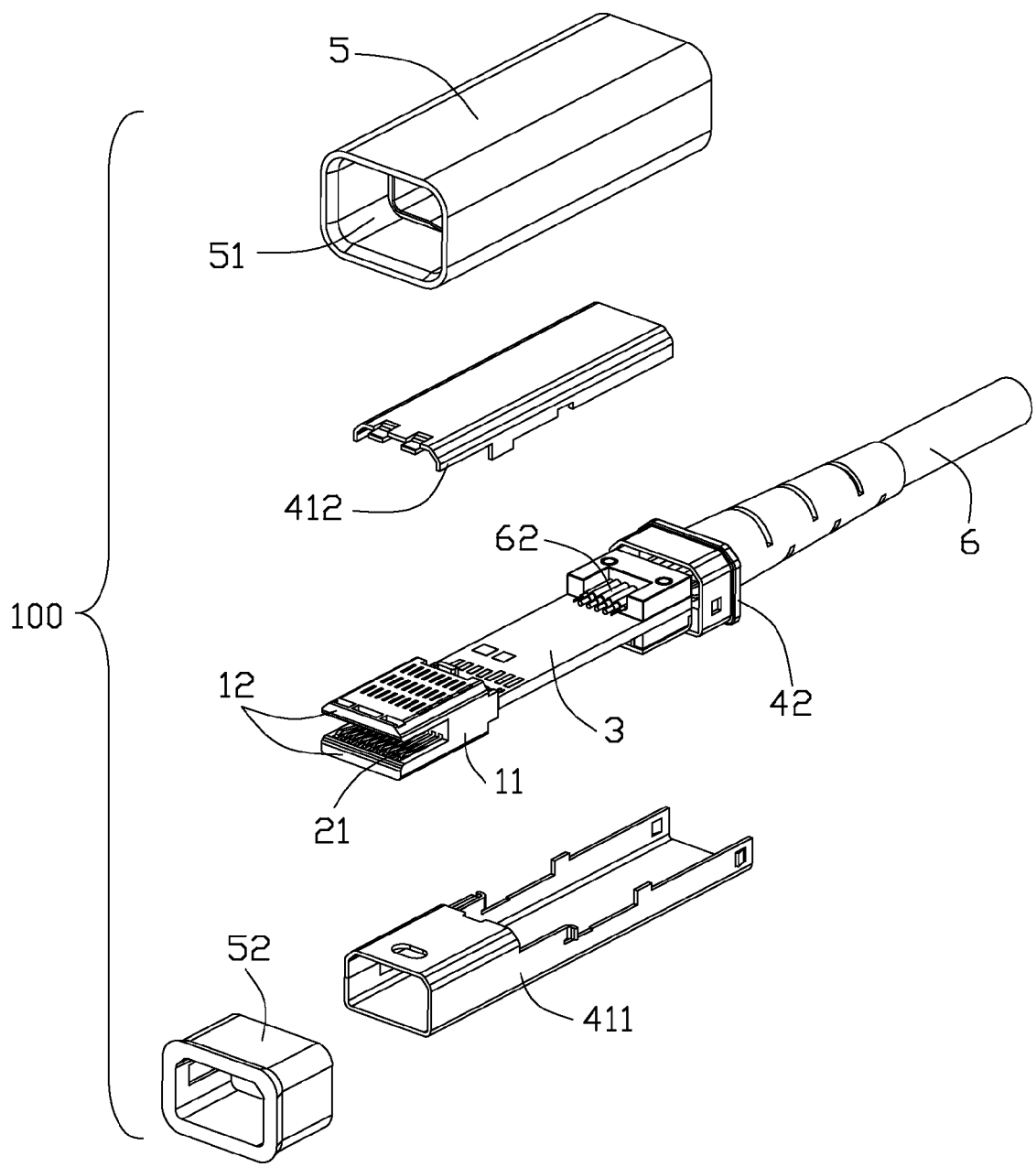
FIG. 5 is an partial exploded view of FIG. 2.
Figure 6:
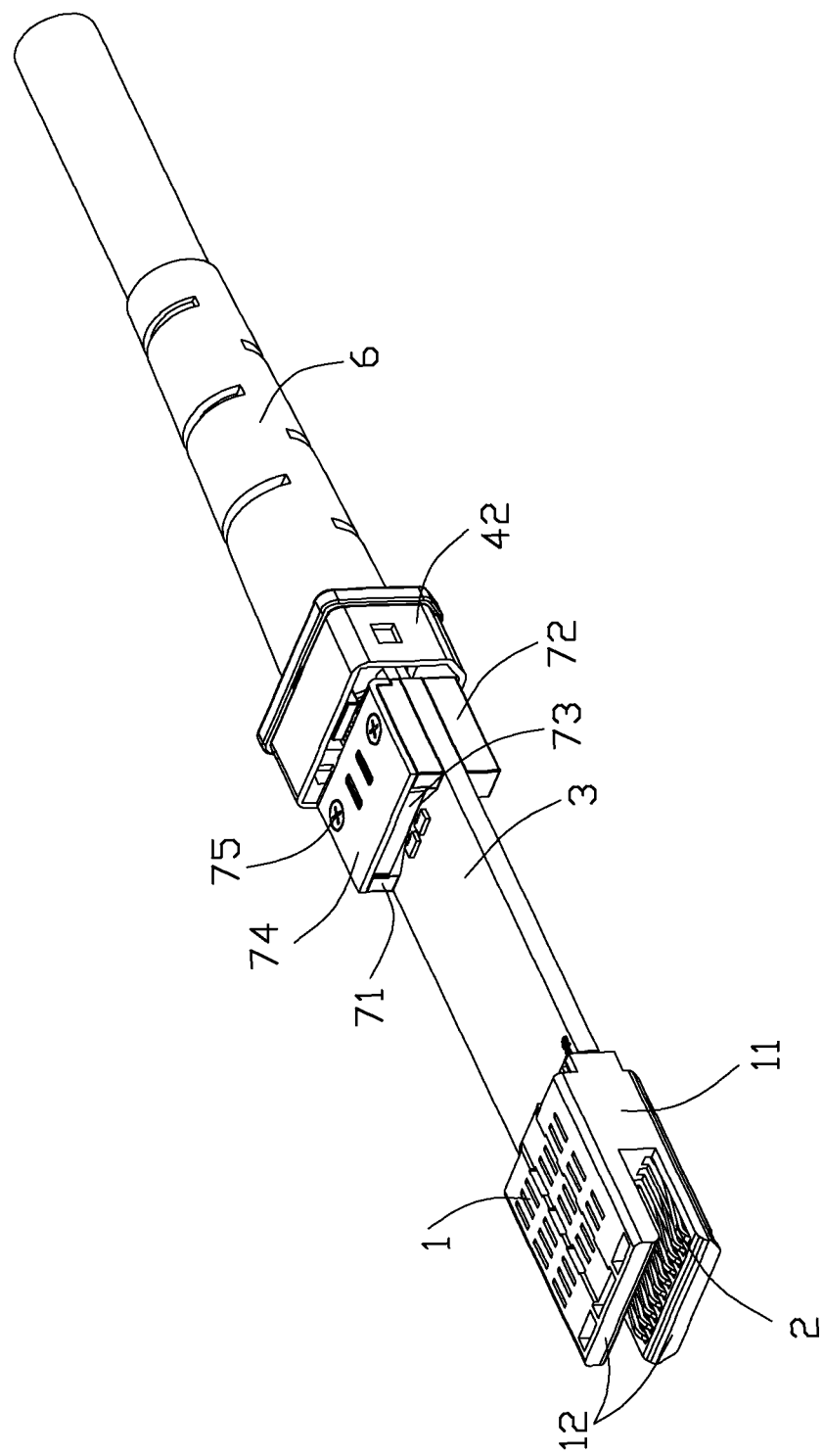
FIG. 6 is an enlarged view of a portion of the FIG. 5.
Figure 7:
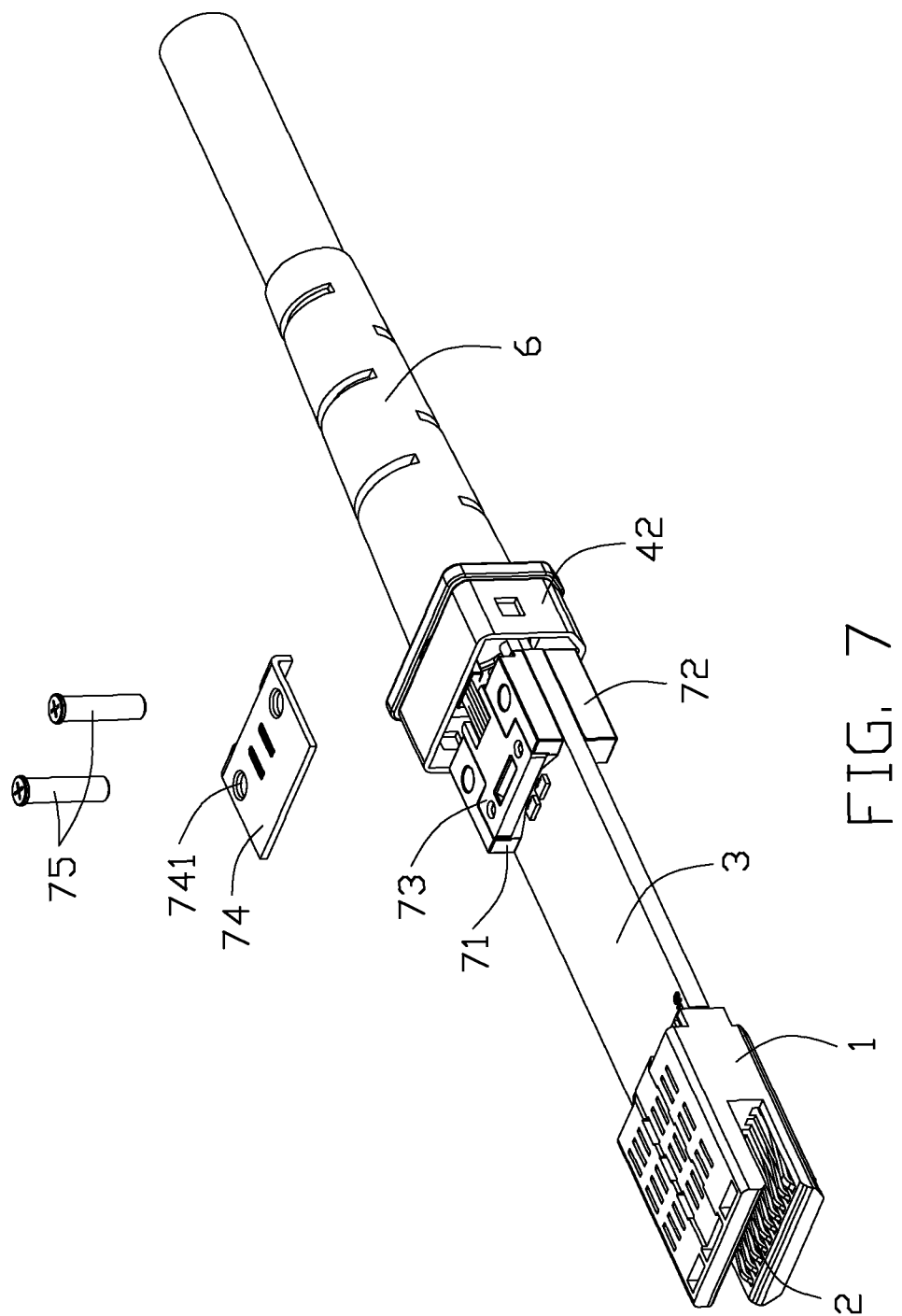
FIG. 7 is a partial assembled view of FIG. 6.

Referring to FIGS. 3 to 5, the insulative housing 1 comprises a base portion 11 and a pair of spaced togue portions 12 extending forwardly from a front surface of the base portion 11. The pair of togue portions 12 respectively defines a plurality of passageways (not numbered) formed on two opposite inner surfaces and extending rearwardly to a rear surface of the base portion 11 for receiving contacts 2. The metallic shell 4 has a front portion enclosing the two tongue portions 12. Thus, a receiving room 10 is commonly formed by the front portion of the metallic shell 4 and the two tongue portions 12.

Figure 9:
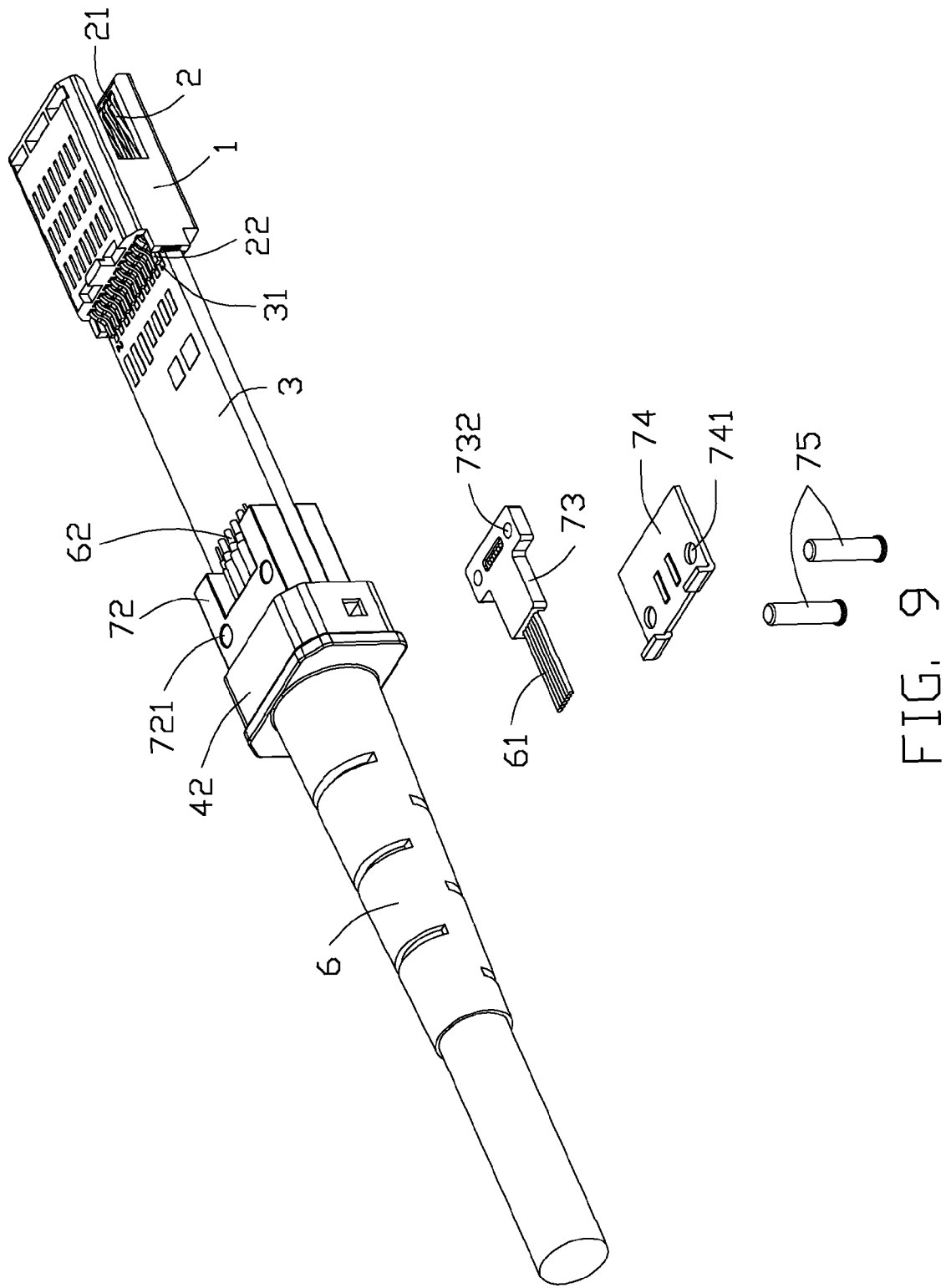
FIG. 9 is similar to FIG. 8, but viewed from another aspect.
Figure 10:
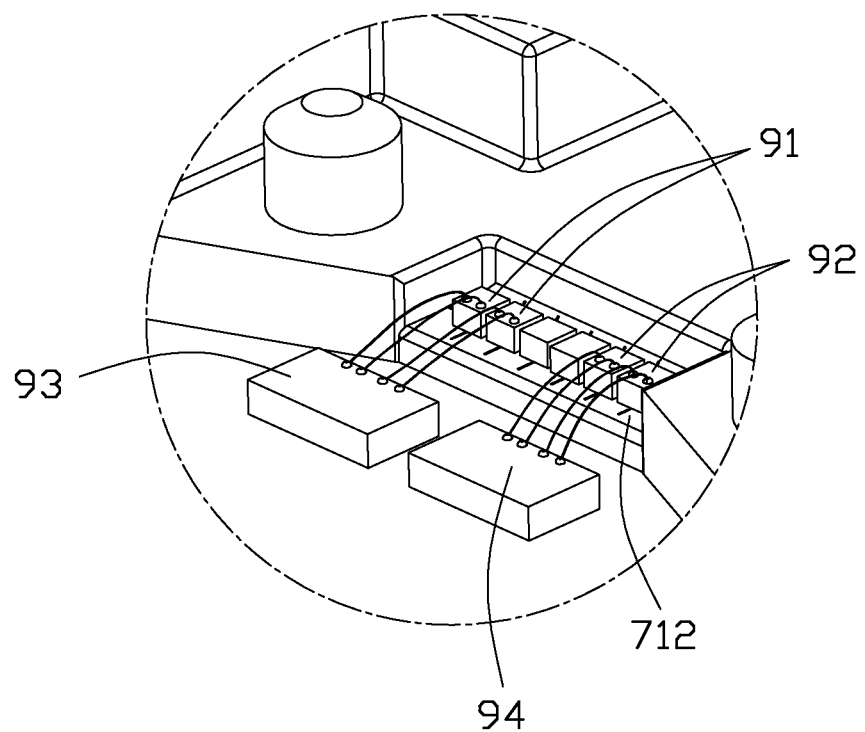
FIG. 10 is an enlarge perspective view of a circular-shaped circle shown in FIG. 8.

Referring to FIGS. 1 to 5 and in conjunction with FIG. 9, the plurality of contacts 2 comprises signal contacts, grounding contacts and power contacts. The plurality of contacts 2 are divided into two rows and all received into the passageways. Each of the contact 2 defines an elastic mating portion 21, a retaining portion (not numbered) engaged with the base portion 11 and a terminating portion 22 extending rearwardly from the retaining portion and beyond rear surface of the base portion. Two rows of mating portions 21 of the contacts 2 are received into front portions of the passageways and extending into the receiving room 10 for mating with corresponding contacts (not shown) of an complementary connector (not shown).

Referring to FIGS. 5 to 9, the printed circuit board 3 defines a plurality of first conductive pads 31 located on top and bottom surfaces of a front end thereof and a plurality of second conductive pads (not shown) for electrically connecting with the cable 6. The terminating portions 22 of the plurality of contacts 2 are soldered to the corresponding first conductive pads 31.

Referring to FIGS. 3 to 5, the metallic shell 4 comprises a front shell 41 and a rear shell 42 latched to the front shell 41. The front shell 41 defines two protruding portions 413 located at two sides thereof. The rear shell 42 defines two openings 42 formed at two sides thereof and cooperated with two protruding portions 413. The metallic shell 4 is assembled and enclosed to the insulative housing 1 and the printed circuit board 3. The front shell 41 comprises a bottom cover 411 and a top cover 412 assembled to the bottom cover 411. The insulative housing 1 is enclosed by a front portion of the front shell 41.

Referring to FIGS. 3 to 4, the insulative shell 5 defines a receiving space 51 and encloses the metallic shell 4. And, an inner surface of a front end of the insulative shell 5 is not tightly fit to an outer surface of the metallic shell 4. Thus, a receiving cavity (not labeled) is formed between the metallic shell 4 and the insulative shell 5. The cable assembly 100 further comprises a circular front cover 52 received into the receiving cavity.

Figure 8:
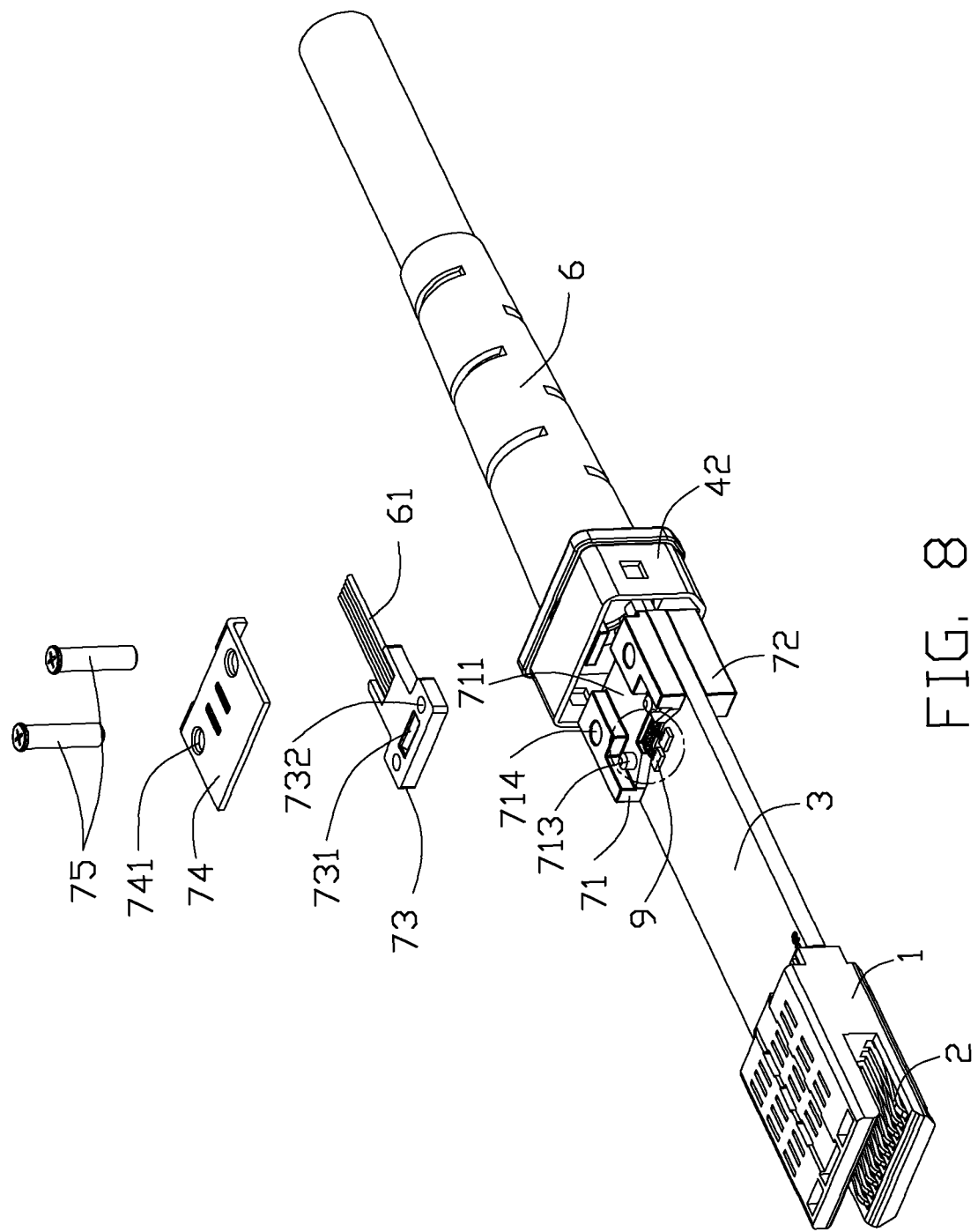
FIG. 8 is another a partial assembled view of FIG. 6.

Referring to FIGS. 8 to 9, the cable 6 comprises a plurality of optical fibers 61 coupled to a top surface of the printed circuit board 3 and a plurality of copper wires 62 electrically connected to a bottom surface of the printed circuit board 3.

Referring to FIGS. 6 to 9, the cable assembly 100 further comprises a first positioning piece 71 and a second positioning piece 72 respectively assembled to top and bottom surfaces of the printed circuit board 3, a lens module 73 located on the first positioning piece 71, a metallic plate 74 assembled to the first positioning piece 71 and the lens module 43, and two engaging pieces 75 interconnecting the first and second positioning pieces 71, 72 to the printed circuit board 3. The lens module 73 has a top surface flush with top surface of the first positioning piece 71.

Referring to FIGS. 6 to 10, the first positioning piece 71 defines a first groove 711 extending downwardly from a top surface thereof and a second groove 712 extending downwardly from a bottom surface of the first groove 711. A pair of positioning posts 713 are formed at two lateral sides of the bottom surface of the first groove 711. The first positioning piece 71 further defines two first through holes 714 for the engaging pieces 75 passing through. The second positioning piece 72 is attached to the bottom surface of the printed circuit board 3 and used for holding the copper wires 62 to the bottom surface of the printed circuit board 3. The second positioning piece 72 also defines two second through holes 721 corresponding to the first through holes 714.

Referring to FIGS. 8 to 9, the optical module 73 defines a plurality of lens 731 formed therein and coupled to the optical fibers 61 of the cable 6. The plurality of lens 731 are inclined arranged in the optical module 73 at 45 degree. Thus, optical signal transmission in a horizontal can be refracted in a vertical direction by the plurality of lens 731. The optical module 73 defines two positioning holes 732 cooperated with two positioning posts 713. The metallic plate 74 defines two circular openings 741 in alignment with two positioning holes 732 in an up-to-down direction. The engaging piece 75 pass through the circular opening 741, the first through hole 714, through hole (not shown) formed in the printed circuit board 3 and the second through hole 721 in turn. Thus, the metallic plate 74, the optical module 73, the first positioning piece 71, the printed circuit board 3, and the second positioning piece 72 are interconnected with each other via the engaging piece 75. The engaging piece 75 can be a pin or screw.

Referring to FIGS. 6 to 10, the cable assembly 100 further comprises an optoelectronic component 9 for converting electrical signal received from a complementary connector to optical signal which can be transmitted in optical fiber 61 of the cable 6, and for converting optical signal transmission in optical fiber 61 to an electrical signal. The optoelectronic component 9 comprises an optical source array 91, an optical detector array 92 mounted in the second groove 712 and a driver 93 and an amplifier 94 mounted on the printed circuit board 3. The driver 93 is connected with the optical source array 91. Thus, the optical source array 91 is actuated to emit light by the driver 93. The amplifier 94 is connected with optical detector array 92 to amplify the electrical signal converted from the optical signal from optical detector array 92. In this embodiment, the optical source array 91 is an array of vertical cavity surface emitting lasers ("VCSELs") or light emitting diodes ("LEDs", or the like. Optical detector array 92 is an array of photodetectors, such PIN photodiodes, avalanche photodiodes, or the like.

Referring to FIGS. 1 to 10, the assembling process of the cable assembly 100 made in according to the present invention starts from assembling the plurality of contacts 2 to the insulative housing 1. Then, the printed circuit board 3 is assembled to the rear end of the insulative 1, and soldered to terminating portions 22 of the contacts 2. Then, the copper wires 62 of the cable 6 are soldered to the bottom surface of the printed circuit board 3, the optical fibers 61 are inserted into the optical module 73 and coupled to the lens 731 of the optical module 73. Then the first positioning piece 71 is mounted on the top surface of the printed circuit board 3, the driver 93 and amplifier 94 are respectively connected with the optical source array 91 and optical detector array 92 via a plurality wires. Then, the optical module 73 is received into the first groove 711 of the first positioning piece 71. And, the positioning posts 713 are received into the positioning holes 732. Then, the metallic plated 74, the first positioning piece 71, the optical module 73, the second positioning piece 72 are interconnected with each other via engaging pieces 75. Then, the metallic shell 4 is assembled to and encloses the insulative housing 1 and the printed circuit board 3. At last, the insulative shell 5 and the front cover 52 are assembled to the metallic shell 4.

Referring to FIGS. 1 to 10, due to cable assembly 100 with an electrical-optical hybrid cable 6, the cable assembly 100 can transmit not only optical signals, but also electrical signals. Thus, the cable assembly 100 can meet high speed signals transmission requirement and provide power supply function at the same time.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cable assembly comprising:
an insulative housing;
a plurality of contacts received into the insulative housing;
a printed circuit board located behind the insulative housing and electrically connected with the plurality of contacts;
a metallic shell enclosing the insulative housing and the printed circuit board;
an insulative shell enclosing a rear portion of the metallic shell; and
a cable having a plurality of optical fibers coupled to a top surface of the printed circuit board and a plurality of copper wires electrically connected to a bottom surface of the printed circuit board, wherein
the cable assembly further comprises an optical module located on the top surface of the printed circuit and coupled to the plurality of optical fibers; wherein
the cable assembly further comprises a first positioning piece located on the top surface of the printed circuit to support the optical module, and a second positioning piecec located on the bottom surface of the printed circuit to hold the plurality of copper wires; wherein
the cable assembly further comprises a metallic plate located on the first positioning piece and the optical fiber and engaging pieces interconnecting the metallic plate, the first positioning piece, the printed circuit and the second positioning piece.

2. The cable assembly as recited in claim 1, wherein the cable assembly further comprises a circular front cover sandwiched between the insulative shell and the metallic shell.

3. The cable assembly as recited in claim 1, wherein the metallic shell comprises a front shell and a rear shell engaged with the front shell, the front shell comprises a top cover and a bottom cover.

4. The cable assembly as recited in claim 1, wherein the insulative housing defines a base portion and a pair of spaced togue portions extending forwardly from a front surface of the base portion.

5. The cable assembly as recited in claim 4, wherein the metallic shell has a front portion enclosing two tongue portions to form a receiving room.

6. The cable assembly as recited in claim 1, wherein the cable assembly further comprises an optoelectronic component formed therein to convert optical signal to electrical signal, and convert electrical signal to optical signal.

7. The cable assembly as recited in claim 6, wherein the optoelectronic component comprises an optical source array and a driver connected with each other, and optical detector array and an amplifier connected with each other.

8. The cable assembly as recited in claim 7, wherein the optical module comprises a plurality of lens arranged in the optical module at 45 degree and coupled to the corresponding optical fibers.

9. A cable connector assembly comprising:
an insulative housing;
a plurality of contacts received into the insulative housing and including signal contacts, grounding contacts and power contacts;
a printed circuit board defining opposite first and second surfaces and located behind the insulative housing and electrically and mechanically connected with the plurality of contacts; and
a cable located behind the printed circuit board and having a plurality of optical fibers coupled to the signal contacts via an optoelectronic component which is mounted upon the first surface of the printed circuit board for mutually converting electrical signals and optical signals, and a plurality of copper wires electrically connected to the corresponding power contacts and located on the second surface of the printed circuit board;
wherein tails of the contacts are mechanically connected to a front region of the printed circuit board and the copper wires are mechanically connected to a rear region of the printed circuit board and electrically connected to the corresponding contacts via traces of the printed circuit board;
further including a first positioning piece located on the first surface of the printed circuit board to retain a lens module for coupling to the optoelectronic component, and a second positioning piece located on the second surface of the printed circuit board to regulate the copper wires in position; wherein
the cable connector assembly further comprises a metallic plate located on the first positioning piece and the optical fiber, and engaging pieces interconnecting the metallic plate, the first positioning piece, the printed circuit and the second positioning piece.

10. The cable connector assembly as claimed in claim 9, wherein the printed circuit board is located at a mid-level of the housing, and said contacts are arranged in two rows with corresponding tails on said first surface and said second surface of the printed circuit board, respectively.

11. The cable connector assembly as claimed in claim 9, further including a metallic shell enclosing said housing and said printed circuit board.

12. The cable connector assembly as claimed in claim 9, wherein the printed circuit board is located between the housing and the cable in a front-to-back direction.

13. The cable connector assembly as claimed in claim 9, wherein the housing forms a receiving room, and each of said contacts includes a front mating portion extending into the receiving room for mating with a complementary connector and a rear terminating portion to be mechanically and electrically connected to the printed circuit board.

14. A cable connector assembly comprising:
an insulative housing forming a receiving room;
a plurality of contacts received into the insulative housing and including signal contacts, grounding contacts and power contacts, each of said contacts including a front mating portion extending into the receiving room for mating with a complementary connector, and a rear terminating portion;
a printed circuit board defining opposite first and second surfaces and located behind the insulative housing and electrically and mechanically connected with the rear terminating portions of the plurality of contacts; and
a cable located behind the printed circuit board and having a plurality of optical fibers coupled to the signal contacts via an optoelectronic component which is mounted upon the printed circuit board for mutually converting electrical signals and optical signals, and a plurality of copper wires mechanically connected to the printed circuit board to electrically connect to the corresponding power contacts;
wherein rear terminating portions of the contacts are mechanically connected to a front region of the printed circuit board and the copper wires are mechanically connected to a rear region of the printed circuit board and electrically connected to the corresponding contacts via traces of the printed circuit board;
further including a first positioning piece located on the first surface of the printed circuit board to retain a lens module for coupling to the optoelectronic component, and a second positioning piece located on the second surface of the printed circuit board to regulate the copper wires in position; wherein
the cable connector assembly further comprises a metallic plate located on the first positioning piece and the optical fiber, and engaging pieces interconnecting the metallic plate, the first positioning piece, the printed circuit and the second positioning piece.

15. The cable connector assembly as claimed in claim 14, wherein an insulative shell encloses circumferentially said printed circuit board and is located between said housing and said cable in a front-to-back direction.

* * * * *